Patented Feb. 15, 1938

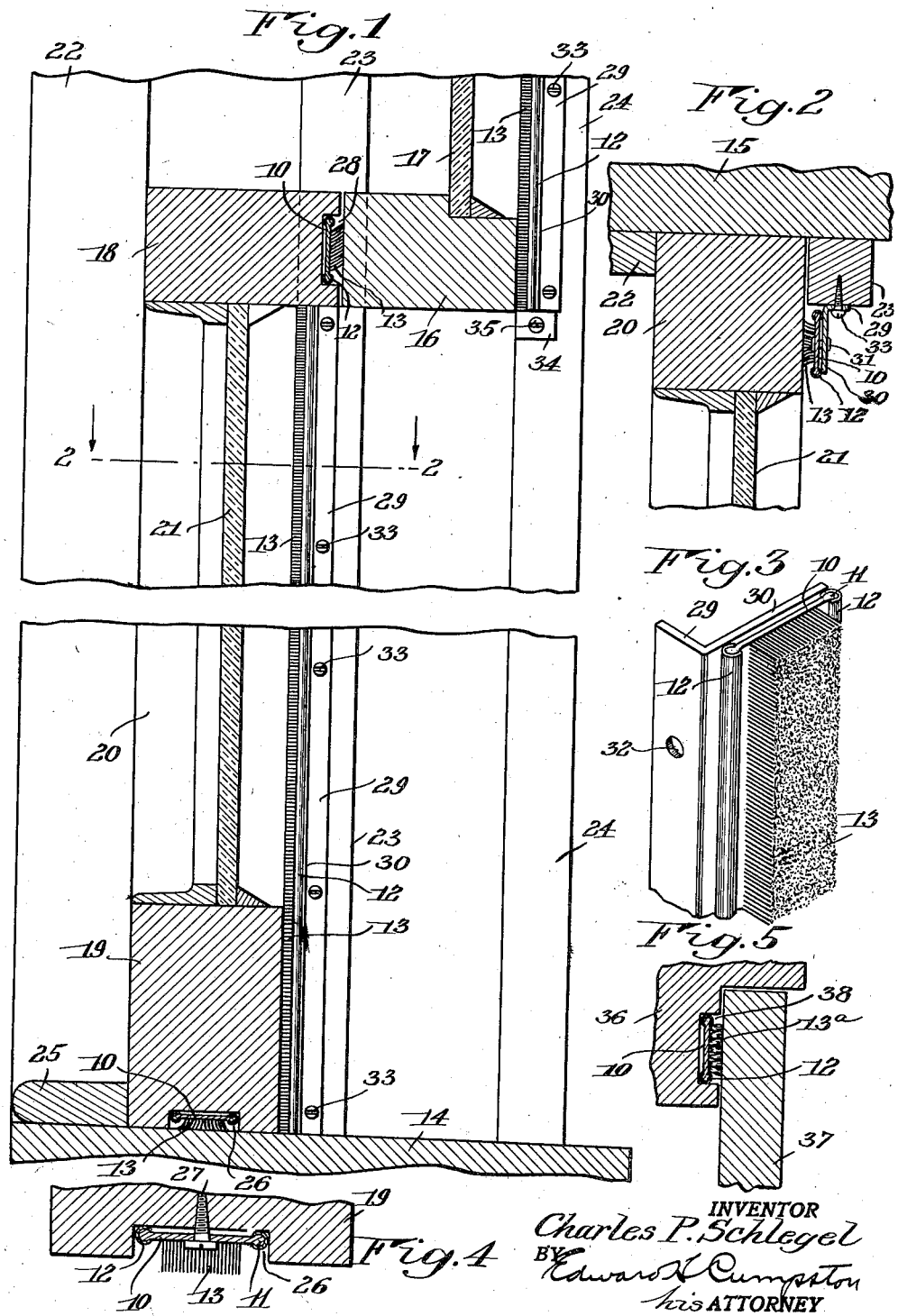

2,108,450

UNITED STATES PATENT OFFICE 2,108,450

CLOSURE AND WEATHER STRIPPING THEREFOR

Charles P. Schlegel, Rochester, N. Y., assignor to The Schlegel Manufacturing Company, Rochester, N. Y., a corporation of New York Application April 12, 1935, Serial No. 16,053

6 Claims. (Cl. 20—69)

The present invention relates to weather stripping for sealing the joints between doors, windows, and other closures and the framework therefor and has for its object to provide sealing means of this class which is of a highly durable and efficient nature and which will retain its shape and effectiveness during relatively long periods of usage.

A further object of the invention is to provide in conjunction with a door or other closure and the framework forming the door opening, an improved weather strip constructed in part of relatively stiff closely related resilient fibers which will yield to the pressure of the closure and which will tightly seal the joint between the latter and the framework and assume normal upstanding position as soon as the pressure is relieved.

A further object of the invention is to provide a woven weather strip having a backing section with relatively long densely related pile fibers thereon, which may be of the cut or uncut variety, and which will effectively protect the joints between the closure and the framework against bad weather conditons, as well as make it possible to avoid the use of weather strips formed of rubber, felt, and other similar materials, which have proven unsatisfactory by reason of the fact that they tend to harden and deteriorate, as well as lose their resiliency after being used for a comparatively short time.

To these and other ends the invention resides in certain improvements and combinations of parts, all as will be hereinafter more fully described, the novel features being pointed out in the claims at the end of the specification.

In the drawing:

Fig. 1 is fragmentary sectional elevation of a structure illustrating one embodiment of the invention;

Fig. 2 is a horizontal section on line 2—2 of Fig. 1;

Fig. 3 is a perspective view of one end of the weather guard shown in section in Fig. 2;

Fig. 4 is a fragmentary sectional elevation drawn to an enlarged scale and illustrating the manner of attaching the weather strip to the bottom of the sash shown in Fig. 1, and Fig. 5 is a horizontal section of a modification showing the application of the weather strip to the framework of a door.

The same reference numerals throughout the several views indicate the same parts.

Heretofore it has generally been customary to construct weather stripping of such materials as rubber, felt, or cloth. As is well known, rubber quickly hardens and deteriorates, thereby losing its elasticity and usefulness for the purpose intended, while felt has a comparatively short life, due to its becoming packed and hardened when subjected to substantially continuous pressure even for a comparatively short time. Furthermore, both rubber and felt are relatively expensive as compared to woven pile fabic strips, constructed in accordance with the disclosure shown and described herein.

The fabric is preferably woven in strip form and in such a manner that it is particularly adapted for use as weather stripping, capable of effectively excluding cold air, rain and dust from the parts to be protected.

The present woven textile strip comprises a backing section conventionally indicated at 10 and provided with selvaged edges 11 disposed within the bead-like supporting channels 12, preferably formed of flexible material such, for example, as relatively soft metal which will readily bend and accommodate itself to the supporting parts upon which it is positioned to form an effective seal between the latter and the woven backing section of the strip.

The cut pile indicated at 13, which may be of the uncut variety if desired, comprises relatively long stiff pile fibres formed of suitable material such, for example, as mohair, goat hair, worsted, jute or other material suitable for the purpose. The fibers are preferably closely related and are interwoven with the strands of the textile backing section 10 and project therefrom to form a resilient pad. The fibers will readily bend or tend to flatten out under the pressure of the door or window but will automatically straighten out and return to normal position when the pressure thereon is relieved.

In Figs. 1 and 2 portions of a window frame are shown, including the window sill 14 and one of the upstanding side frame members 15. The lower rail of the upper sash of the window is indicated at 16 and a portion of the window pane at 17. The upper and lower rails of the lower sash are designated by the reference numerals 18 and 19, respectively, and one of the side or vertical sash bars is indicated at 20, while the lower window pane is shown at 21. The usual inner and outer guides for the lower sash are shown at 22 and 23, respectively. The upper sash is disposed between the guide 23 of the lower sash and the outermost guide 24, as indicated in Fig. 1. An antirattling strip 25 is placed on the window sill 14 for engagement with the rail 19 of the lower sash when the latter is in closed position as shown in Fig. 1.

The bottom rail of the lower sash is recessed at 26 to receive the previously described weather strip, which is best shown in Fig. 4. Screws 27 are preferably employed to secure the strip within the recess, but other suitable means may be used for this purpose, if desired. When the inner sash is in closed position the pile fiber pad will be somewhat compressed in which case the pile fibers will be bent or deflected to afford a dense, portecting surface in contact with the upper face of the window sill, thus effectively sealing the joint between the latter and the lower rail of the sash, it being understood that as soon as the pressure on the weather strip is relieved that the resilient pile fibers will spring back to normal position.

A weather strip similar to that shown in Fig. 4 is interposed between the upper rail of the lower sash and the lower rail of the upper sash, as shown in Fig. 1. This strip may be fixed upon either of the rails 16 or 18, preferably the latter, which is grooved or recessed at 28 to receive the strip. Suitable means not shown is provided for securing the strip within the recess such, for example, as screws or nails driven through the backing 10 of the strip, as indicated in Fig. 4.

The strip disposed within the upper rail of the lower sash will not interfere in any way with the raising and lowering of the sash. However, when the upper and lower sash are in closed position, the joint between said rails will be effectively sealed by the strip.

It will be noted that the channels or beads 12 of the backing 10 of the strip serve to hold the latter in spaced relation to the portion of the rail of the sash on which the channels are disposed, as shown in Fig. 4. However, when pressure is applied to the resilient pad 13 of the strip, the flexible backing 10 may, if the pressure is sufficient, yield or be deflected inwardly to better accommodate the pad to the parts between which it is confined when in operation.

The joints between the vertical sash members 20 and the frame 15 and sash guide strips 23 thereon are protected by the weather guard shown in Figs. 2 and 3. In this arrangement the weather strip proper is the same as that shown in Fig. 4 and therefore it has been given the same reference numerals. It is however attached to a suitable support of the same length as the strip, such, for example, as the angle bar shown in perspective in Fig. 3, and having flanges 29 and 30, on the latter of which the weather strip is secured by a suitable number of rivets 31 as indicated in Fig. 2, the rivets being extended through the backing 10 of the strip and the flange 30 of the support. The flange 29 of the support is provided with apertures 32 for the reception of the screws 33 which serve to secure the support upon the sash guide 23 as indicated in Figs. 1 and 2.

The resilient pile fiber pad which forms a part of the weather guard shown in Figs. 1 and 2, engages the vertically extending side bar 20 of the lower sash on the outer face thereof, as shown in section in Fig. 2 and in elevation in Fig. 1. The lower ends of the angular support and the weather strip thereon both engage the window sill 14 and extend therefrom to a point at which their opposite ends will contact with the lower face of the upper rail 18 of the lower sash when the latter is in closed position as shown in Fig. 1. Thus the weather strip and the support on which it is mounted cooperate to effectively seal the joint between the vertical side bar of the sash and the guide strip 23, thereby protecting the joint between the sash and the frame member 15.

Likewise the joints between the vertical side bars of the upper sash and the guide strips 24 are sealed and protected as shown in Fig. 4 by the same type of weather guard as that just described and shown in section in Fig. 2. However the opening between the lower end of the weather guard and the guide strip 24 is closed by a block 34 formed of rubber or other suitable material and secured on the strip by a screw 35, as shown in Fig. 1.

The modification illustrated in Fig. 5 shows the application of a weather strip of the type disclosed in Fig. 4 to one of the side members of a door frame. These weather strips are the same with the exception that the pile of one is cut as indicated in Fig. 4, and is uncut in the other. The parts of the weather strip shown in Fig. 5 corresponding to those shown in Fig. 4 have therefore, been given the same reference numerals, the uncut pile of Fig. 5 being indicated at 13a.

The door post to which the keeper for the bolt is usually attached is conventionally shown at 36 in Fig. 5 and a portion of the door at 37. The post is recessed at 38 to receive the weather strip which includes the flexible backing 10, the supporting channels 12 thereon and the uncut pile 13a, forming the resilient pad for sealing the joint between the door and the post. The weather strip may be secured within the recess 38 by any suitable means not shown, as, for example, in the manner shown in Fig. 4.

One advantage of using uncut pile is that the uncut loops constitute in effect elliptical springs which when pressed down by the door or window tend to increase the resiliency of the pad as well as to increase its resistance to the passage of air therethrough by increasing its denseness, whereby to more effectively seal the joint to be protected. In other words, when the door or window is closed the many resilient fibers of the pad will become densely packed together to increase the effectiveness of the seal, but as soon as the pressure on the fibers is relieved they will quickly straighten out and assume normal position.

I claim:

1. In a device of the class described, a frame member, a closure member, one of said members having a substantially rectangular shallow groove disposed opposite a face of the other member, a weather guard within said groove comprising a woven strip of material having laterally and outwardly extending densely related pile fibers of greater length than the distance between said strip and said face, said pile fibers yieldingly engaging and being deflected by said face whereby to exert pressure on said face to effectively seal the joint between said members.

2. In a device of the class described, a frame member, a closure member, one of said members having a substantially rectangular shallow groove disposed opposite a face of the other of said members, a weather guard within said groove comprising spaced channels connected by a flexible strip having laterally and outwardly extending long pile fibers of greater length than the distance between said flexible strip and said face and yieldingly engaging and being deflected by said face whereby to exert pressure on said face to effectively seal the joint between said members.

3. In a device of the class described, a frame member, a closure member, an angular support having one leg thereof seated on and connected with one of said members and having the other leg spaced from and substantially paralleling the other of said members, and a weather guard secured on the last mentioned leg of the support and comprising spaced channels and a flexible woven textile strip having its opposite edges disposed within the channels, said strip having densely related laterally extending interwoven pile fibers yieldingly engaging and being deflected by the last mentioned member, said strip and support serving to seal the joint between said members.

4. A weather strip for sealing the space between cooperating frame and closure members, comprising separate spaced independently mounted channels each comprising a thin strip of pliable metal bent upon itself and of substantially uniform thickness, and a woven textile strip having its side edges secured within said channels, said strip having interwoven upstanding relatively long pile fibers for resiliently engaging one of said members, said channels being adapted to engage the other of said members and to cooperate with said pile fibers to seal the space between said members.

5. Means for sealing the space between cooperating frame and closure members, comprising a support having angularly disposed portions, a weather guard attached to one of said angularly disposed portions, said guard comprising separate spaced channels and a woven textile strip having its side edges secured within said channels, said strip having laterally extending densely related pile fibers on one side thereof, said support being adapted for attachment to one of said members and serving to maintain the pile fibers in engagement with the other of said members when the closure member is in closing position.

6. Means for sealing the space between cooperating frame and closure members comprising a weather guard including a woven textile strip having densely related laterally extending interwoven pile fibers for yielding engagement with one of said members when the strip is interposed between the members, and bead-like supporting channels enclosing the side edges of said strip, said channels each being formed of a thin strip of soft pliable metal the opposite side edges of which are clamped in engagement with said woven strip, said channels being adapted to independently accommodate themselves to the surfaces of the member upon which they are positioned, said woven strip being sufficiently rigid to hold the channels in spaced relation and the guard being adapted for connection with the member upon which it is disposed by extending one or more securing parts therefor through the flexible woven strip into said member.

CHARLES P. SCHLEGEL.